Sept. 9, 1969     R. C. MARSH     3,465,438
CUTTING ACCESSORY FOR A POWER TOOL
Filed April 19, 1966
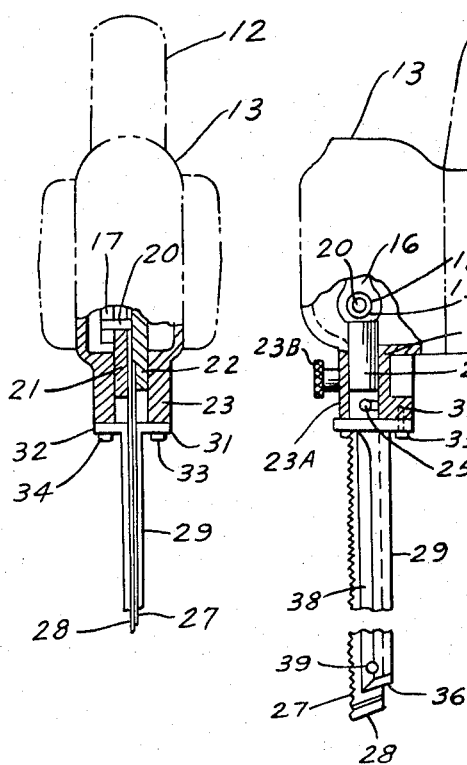
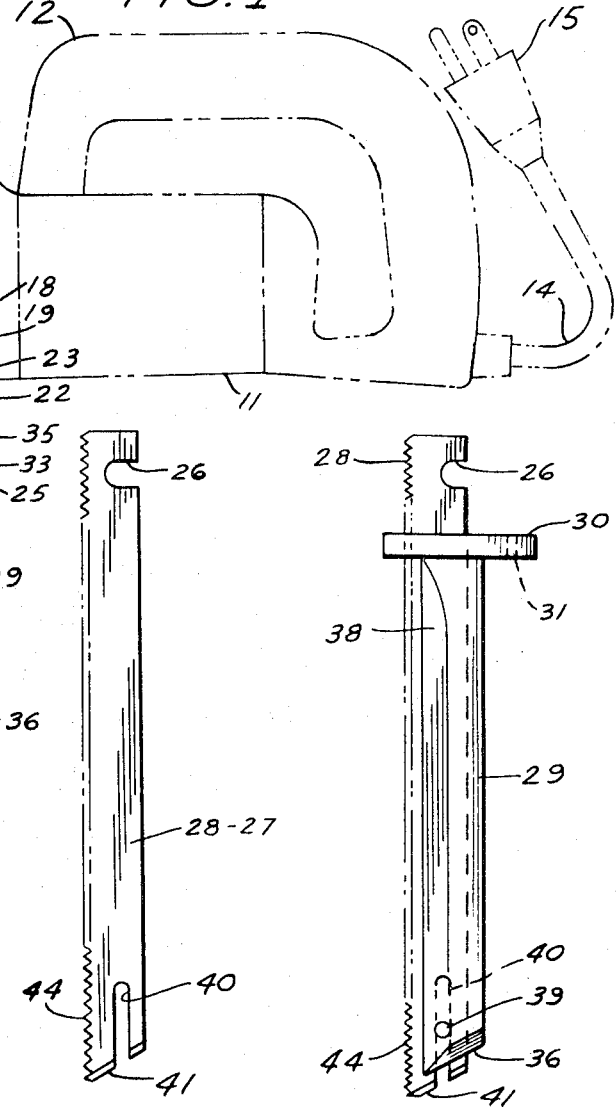
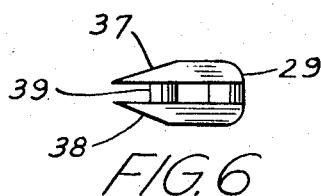
RICHARD C. MARSH
INVENTOR.
BY Edward M. Apple
ATTORNEY ated Sept. 9, 1969

3,465,438
CUTTING ACCESSORY FOR A POWER TOOL
Richard C. Marsh, 7333 Fenkell Ave.,
Detroit, Mich. 48238
Filed Apr. 19, 1966, Ser. No. 543,684
Int. Cl. B26f 1/00; B26b 19/02; B27b 11/00
U.S. Cl. 30—359                                                   3 Claims

ABSTRACT OF THE DISCLOSURE

This application discloses a cutting accessory for a power tool which is intended to be used in making cut-outs in motor vehicle floor mats, which generally are made of heavy rubber backed with a thick layer of matting, or other cushioning or sound proofing material.

The invention resides in the provision of a pair of longitudinally, oppositely reciprocating, toothed blades, which reciprocate in a channel like guide member attached to a power tool. The blades have their free ends extending beyond the channel shaped guide member, and the blades are provided at their free ends with angular cuts and with teeth along one edge, which teeth are beveled. The channel shaped guide is angularly cut at the free end as well as are the blades, so that the tool may quickly be inserted through a workpiece to be cut.

---

This invention relates to power tools having reciprocating double blades, such as disclosed in Patent No. 2,623,283, issued to Godfrey et al. and has particular reference to an accessory for use with such a tool.

The device disclosed in said patent is intended for cutting elastic, yieldable cellular material such as foam rubber, whereas the instant device is intended for use in cutting motor vehicle floor mats, which generally are made of heavy rubber backed with a thick layer of matting, or other cushioning or sound proofing material.

Such a combination of materials is very difficult, if not impossible, to cut with conventional tools, including the device disclosed in the above cited patent, even if the operator starts at the edge of the mat.

When it is necessary to pierce the mat inside its edges and make a cut out for a brake pedal, an accelerator linkage or the like, the patented device will not function until a hole is first pierced in the mat with a sharp knife or other instrument. This necessitates a separate operation and requires the operator to lay aside the power tool and take up the manual tool to effect the initial cut and then lay down the hand tool and again take up the power tool to finish the cutting operation. This takes time and oftentimes results in poor workmanship because a knife has a tendency to slip and make a cut out of line with the intended contour of the opening to be made.

In attempting to use the patented tool to make an internal cutout, the initial hole would first have to be cut large enough to admit the large foot element of the guide.

All of this is obviated by using the device embodying the invention, for the reason that the invention device can effect the original piercing or plunge cut of the material and can then be moved with a continuous and uninterrupted motion to follow the contour of the intended cutout, thus effecting a result which cannot be accomplished by any tool now known to the public.

It is therefore an object of the invention to provide a cutting device which will adequately, quickly and efficiently initially pierce and then cut holes in a car mat of the character indicated.

Another object of the invention is to provide an accessory for a power tool of the character indicated, which is provided with a guide and reciprocating blades, each having a special sharp free end which serves to plunge cut and initially enter the mat, so that the cutting operation may be started and completed without the necessity of withdrawing the tool after the initial piercing operation.

Another object of the invention is to generally improve devices of the character indicated and to provide an accessory for a power tool which is simple in construction, economical to manufacture, easy to attach and detach from the power tool, and one which is efficient in operation.

The foregoing and other objects and advantages of the invention will become more apparent as the description proceeds, reference being made from time to time to the accompanying drawing, forming part of the within disclosure, in which drawing:

FIG. 1 is a side elevational view, with parts broken away, and parts in section, of a reciprocating power tool to which is attached the device embodying the invention. The invention resides in that part of the structure which is shown in solid lines.

FIG. 2 is a left end view of the assembly shown in FIG. 1, with parts broken away and parts in section.

FIG. 3 is an enlarged side elevational view of one of the cutting blades used in the device.

FIG. 4 is a bottom view of the guide and blades shown in FIGS. 1 and 2.

FIG. 5 is an enlarged elevational view of the device embodying the invention removed from the power tool.

FIG. 6 is a bottom end view of the guide with the blades removed.

Referring now more particularly to the drawing, it will be understood that in the embodiment herein disclosed the reference character 11 indicates the motor housing of a power tool, having a handle 12, and a housing extension 13, for enclosing the reciprocating mechanism of the power tool, which is driven in conventional manner by the electric motor which is housed in the housing 11.

The motor of the power tool shown in FIGS. 1 and 2 is driven electrically through an electric extension cord 14, which is provided with a plug 15, which is used to connect the cord 14 to a suitable source of electric power.

The power tool shown in FIGS. 1 and 2 is provided with a pair of pitmans 16 and 17, which are reciprocated through a suitable linkage, not shown, by the motor of the power tool. Each pitman 16 and 17 is provided with an opening 18, which is provided with a bearing 19, in which is received a pin 20 (FIG. 2), which is carried at the end of a slide 21.

The pitman 16 has connected to it a similar slide 22. The slides 21 and 22 reciprocate in a guide member 23, which comprises part of the housing extension 13.

A plate member 23A (FIG. 1) serves as a closure for one side of the guide member 23 and is held in place by means of a set screw 23B, which is received in a threaded bore formed near the center of the guide member 23.

The slides 21 and 22 reciprocate in opposite directions to one another; that is, when the pitman 16 driving the slide 22 is up, the pitman 17 driving the slide 21 will be down.

Each slide 21 and 22 is provided with a pin 24–25. Each pin 24 and 25 is arranged to be received in a lateral slot 26 formed near the upper end of each cutting blade 27 and 28. The blades 27 and 28 reciprocate in a channel-like guide member 29, and both of the blades 27 and 28 normally extend beyond the lower or free end of the guide 29, as shown in FIG. 5, when the driving mechanism of the power tool is on dead center.

This is an important feature of the invention as it permits the reciprocating blades to make the initial cut, or piercing operation in the mat before the entrance of the leading end of the guide member 29. To effect the initial plunge cut, or piercing of the mat, preliminary to the entrance into the mat of the guide 29, I prefer to incline the assembly slightly forwardly so that the cutting teeth of the reciprocating blades may more effectively shear the material comprising the mat.

The guide member 29 is provided with a head 30, having bores 31 and 32 therethrough. The latter being arranged to receive machine screws 33 and 34, which engage threaded bores 35 (FIG. 1) formed in the extension 23 of the housing 13, whereby to secure the guide 29 to the extension 23.

It will be understood that the cutting blades 27 and 28 reciprocate in opposite direction with respect to each other and in timed relation through the pitmans 16 and 17. The opposite reciprocation of the blades 27 and 28 produces a shearing action between them.

The lower or free end of the guide 29 has an angular cut 36 (FIG. 5) and its leading edges 37 and 38 (FIG. 4) are beveled, as shown in FIGS. 4 and 6.

The cutting blades 27 and 28 are retained in the channel guide member 29, by means of a pin 39 which extends through the guide member 29 and is received in a slot 40 formed in the lower end of each cutting blade 27 and 28.

The slots 40 are of sufficient length to permit the cutting blades 27 and 28 to properly reciprocate in the guide 29 and to retain the blades against lateral displacement, yet permit the lower ends of the blades 27–28 to extend well beyond the lower end of the guide 29, even when the reciprocating mechanism driving the blades is on dead center.

Each of the cutting blades 27 and 28 also is provided with an angular cut 41 at the lower or free end. The angle of the cut 36 on the end of the guide and the angle of the cuts on the ends of the blades 27 and 28 are of approximately the same degree. This permits the free ends of the cutting blades 27 and 28 to pierce the mat before the free end of the guide 29 is received in the initial cut. After the free end of the guide 29 is received in the initial cut made by the blades in the mat, any desired shape or cut out may be made in the interior of the mat, without the necessity of starting from the edge of the mat, and without the necessity of first piercing the mat with a knife, or other independent sharp instrument, which is necessary when using the cutting device disclosed in the patent hereinabove referred to.

With the invention device the accessory may be passed through the mat, or other piece of material, at any location and a hole may be cut out of the mat without removing the accessory from the hole initially pierced in the mat. After the initial plunge cut in the mat is made, the cutting operation may continue in any direction.

It will be understood that each cutting blade 27 and 28 is beveled along the cutting edge, as at 42 and 43.

It will also be understood that each tooth of each cutting blade 27 and 28 is beveled on each edge at it 44.

It will also be understood that the contacting faces 45 (FIG. 4) of each blade 27–28 is flat so that the blades may reciprocate in closely contacting relation to one another.

With the cutting blades 27–28 formed in the manner as hereinabove described, and reciprocating in opposite directions, it is obvious that a very effective shearing action may be effected in such materials as automobile floor mats and like materials which are inherently difficult to cut.

It is believed that the operation of the device is obvious from the foregoing description.

Having described my invention, what I claim and desire to secure by Letters Patent is:

1. An accessory for a reciprocating power tool, comprising a channel shaped guide member for simultaneously guiding a pair of oppositely reciprocating toothed blades, a pair of toothed blades reciprocable in said guide member, said guide member having at one end an enlarged portion for attachment to a power tool and having at the free end an angular cut to provide a sharp cutting edge, said blades being longer than said guide member, so that the free ends of said blades reciprocate in an area beyond the free end of said guide and free thereof said free ends of said blades being provided with angular cuts and bevels to provide sharp edges for initially piercing the material to be cut.

2. The structure of claim 1, in which the cutting edge of each blade is beveled.

3. The structure of claim 1, in which each edge of each tooth of each blade is beveled.

References Cited

UNITED STATES PATENTS 2,180,244 11/1939 Kosterman.
2,623,283 12/1952 Godfrey et al. _____ 30—216
2,830,368 4/1958 Knoll et al.
2,908,077 10/1959 Bahlmann.

DONALD R. SCHRAN, Primary Examiner

U.S. Cl. X.R.

30—220, 233; 143—68